Figure 1:
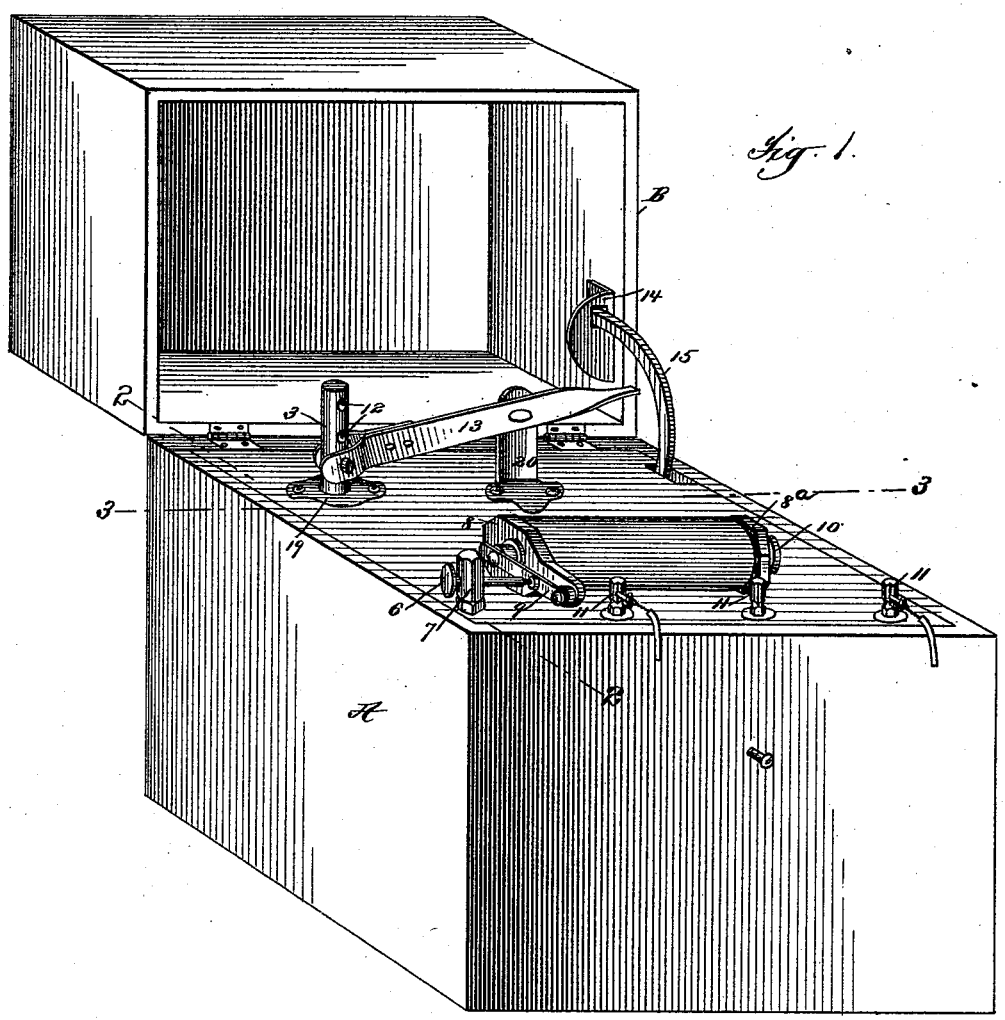

(No Model.) 2 Sheets—Sheet 1.

F. P. & W. A. HOENEMAN.
MEDICAL BATTERY.

No. 429,447. Patented June 3, 1890.

Attest
Geo H Potts
[signature]

Inventors
Franklin P. Hoeneman
William A. Hoeneman
By Philipp Philipp & Hoover
Attys (No Model.) 2 Sheets—Sheet 2.
F. P. & W. A. HOENEMAN.
MEDICAL BATTERY.
No. 429,447. Patented June 3, 1890.
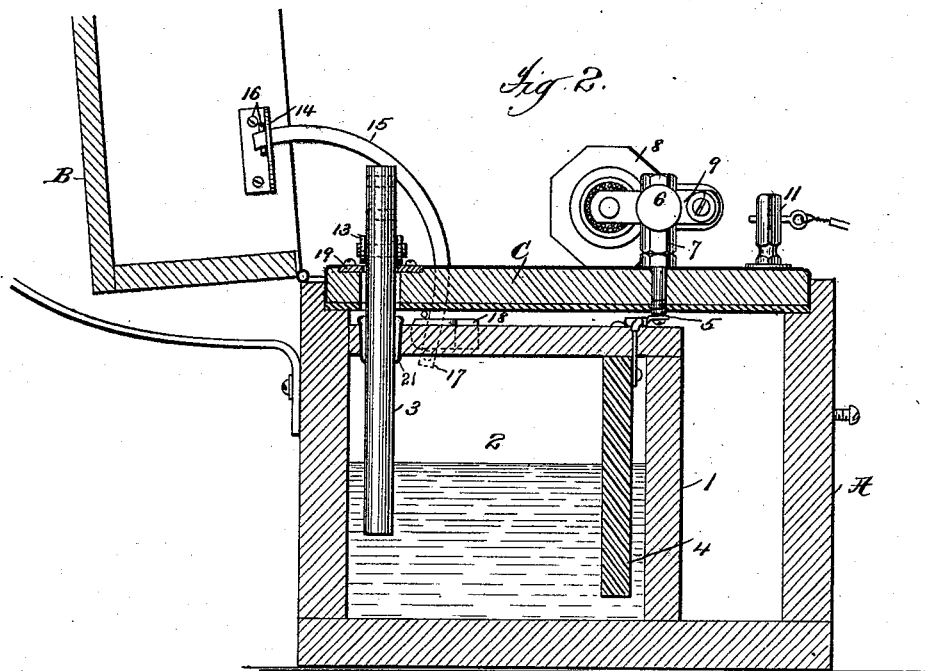
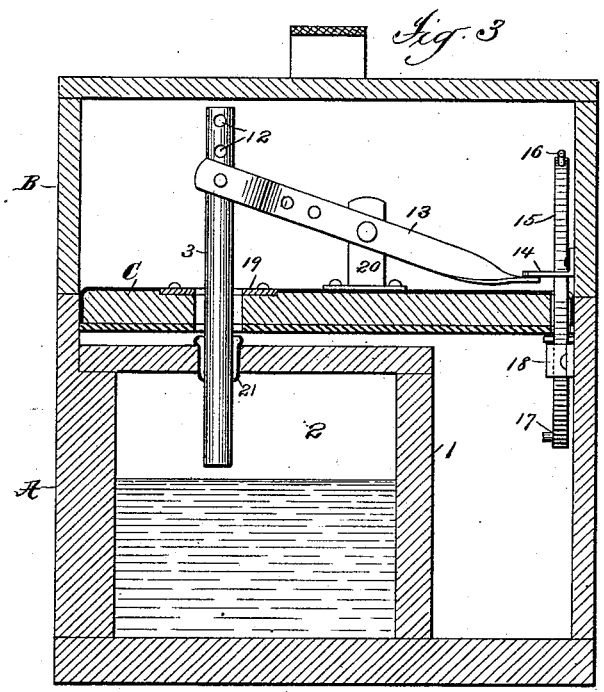
Attest:
Geo. H. Both.
C. M. Borst
Inventors
Franklin P. Hoeneman
William A. Hoeneman
by Philipp, Philipp & Henry
Attys
THE NORRIS PETERS CO., PHOTO-LITHO., WASHINGTON, D. C.

UNITED STATES PATENT OFFICE.

FRANKLIN P. HOENEMAN AND WILLIAM A. HOENEMAN, OF NEW YORK, N. Y.

MEDICAL BATTERY.

SPECIFICATION forming part of Letters Patent No. 429,447, dated June 3, 1890.

Application filed November 18, 1889. Serial No. 330,738. (No model.)

*To all whom it may concern:*

Be it known that we, FRANKLIN P. HOENEMAN and WILLIAM A. HOENEMAN, citizens of the United States, residing at New York, in the county of New York and State of New York, have invented certain new and useful Improvements in Medical Batteries, fully described and represented in the following specification and the accompanying drawings, forming a part of the same.

This invention relates to electric batteries, and especially to small galvanic batteries used for medical and other purposes, its object being to improve their construction and render them more convenient for use. As is well known, it is necessary in such batteries to remove the zinc from the acid when the battery is not in use, because the action of the acid rapidly destroys the zinc and prevents the current being excited.

One of the objects of our invention is to provide means whereby the closing of the case containing the battery shall remove the zinc from contact with the liquid, the zinc being held out of contact as long as the case remains closed, but restored to the acid upon the reopening of the case.

Other objects of our invention are to prevent evaporation of the acid or loss from spilling, and to provide means whereby the zinc may be adjusted, enabling a new portion to be brought into contact with the acid when the portion previously in contact is rendered inoperative, thus avoiding the necessity for frequent changes of zinc, our invention resulting in great saving of acid and zinc and consequent reduction of the cost of running the battery.

A full description of our invention will now be given, reference being had to the accompanying drawings, in which—

Figure 1 is a perspective view of a battery and case therefor, showing our improvements. Fig. 2 is a sectional view taken on the line 2 2 of Fig. 1, and Fig. 3 is a section taken on the line 3 3 of Fig. 1.

A is a case, provided with the cover B and containing a battery, which may be of any ordinary form. As shown, the battery consists of the cell 1, containing the acid 2, in which are immersed the zinc 3 and carbon 4, forming the positive and negative electrodes. The cell is protected by a plate C, of wood or other suitable material, set into the case A, and serving also to support the coil and other parts of the battery, the zinc 3 passing through an opening in the plate. The carbon 4 is connected by a wire 5 with the binding-post 7, from which contact is made with the coil through the contact-screw 6 and spring 9. The coil is supported by the standards 8 $8^a$ in the plate C, and receives the plunger 10 for regulating the strength of the current. This plunger is provided with a scale by which the relative strengths of the currents produced are indicated. The standard 8 of the coil is connected by wires to the binding-post 11, from which contact is made with the handles in the ordinary manner. The wiring is not shown, being of the usual form and consisting of wires on the under side of the plate C, supporting the coil, these wires being insulated. The zinc 3 is connected to the standard 8 in a manner presently to be described.

Referring now to the parts constituting our invention, the zinc 3 has at its upper end a series of openings or perforations 12, which form holders and receive studs projecting from a spring-fork carried by the metallic arm 13, which is pivoted upon a standard 20, attached to the top plate C of the battery. Through this metallic arm 13 and metallic standard 20 contact is made by wires (not shown) through the coil with the standard 8, thus completing the circuit. The term "metallic" is here employed; but it is evident that any conducting material may be used for the arm and standard, or these parts may be made of non-conducting material and the circuit-connections made direct from the zinc, as usual. The other arm of the lever 13 is adapted to be depressed by a projection 14, fixed to the inside of the cover B of the case A, the closing of the cover raising the forked end of the lever 13 and removing the zinc from contact with the acid. The projection 14 is slotted, and a second slotted projection 18 is placed upon the inside of the case. Through these two projections passes a curved link 15, which carries at each end outside of the projection pins 16 17, one of which pins is adapted to catch against the projection 14 and the other against the projection 18 as the case is opened as far as necessary, thus stopping the cover and preventing too great backward movement. The projection 14 thus acts as a trip for the lever 13 and as a guide and stop for the sliding link 15.

19 is a metallic plate surrounding the opening in the plate C, through which the zinc passes, this metallic plate serving to prevent the acid upon the zinc from injuring the parts of the plate C exposed to contact therewith.

Secured in the top of the cell is an elastic washer 21, of rubber or other suitable material, constructed to encircle the zinc closely, but of sufficient flexibility to allow the zinc to pass through it readily when the cover of the case is raised or lowered. This washer serves to pack the opening above the zinc, thus preventing waste through evaporation or through spilling as the battery is moved. This washer may be attached to the cell in any suitable manner. If, as is usual, the cell be a glass case having a neck through which the zinc passes, the washer may be made, as shown, with the upper ring of less flexibility and constructed to surround the outside of the neck and hold the washer in place. It is evident that the form of the washer may be varied widely.

The operation of the device is as follows: As shown in Fig. 1, the case is open and the zinc in contact with the acid. When the cover is closed from this position, the projection 14 strikes the end of the lever 13 and raises the zinc from the acid, holding it in its raised position until the case is again opened. As the cover descends, the link 15 slides through and is guided by the projection 18 until stopped by the rear of case A, when further movement is permitted by the link sliding through projection 14. As the cover is raised the pressure of projection 14 upon the lever 13 is relieved, and the weight of the zinc 3 depresses the forked end of the lever, the zinc passing through the washer 21 into the acid, and the circuit being closed from the zinc through the metallic lever 13 and the standard 20, or otherwise, as desired. As the cover is raised, the link 15 slides through and is guided by the projections 18 and 14 until stopped by the pins 16 and 17 catching against the projections.

As the lower end of the zinc is destroyed the zinc may be adjusted longitudinally, so as to enter farther into the liquid for the use of a new portion, this adjustment being by means of openings 12 in the zinc and the studs upon the inside of the spring-fork of arm 13.

It is evident that the form of the battery or of the case may be changed without departing from our invention, the essential feature of the latter being that the circuit is closed and broken by the opening and closing of the case.

What we claim is—

1. The combination of a battery, a case therefor, and connections between the battery and the case, whereby the closing of the case removes an electrode from the battery-acid and breaks the circuit, and the opening of the case restores the electrode to the acid and closes the circuit, substantially as described.

2. The combination of a battery, a case therefor having a hinged cover, and connections between one of the electrodes and the cover, whereby the lowering of the cover removes the electrode from the acid and the raising of the cover restores it to the acid, substantially as described.

3. The combination of a battery, a case therefor having a hinged cover, and a lever connected to one of the electrodes and operated by the cover, whereby the lowering of the cover removes the electrode from the acid and the raising of the cover restores it to the acid, substantially as described.

4. The combination, with the battery having the electrode 3, and a lever 13, attached to the electrode, of a case A, containing the battery and having a cover B, provided with a projection adapted to engage the lever 13 as the cover is closed, whereby the closing of the cover removes the electrode from the battery-acid, substantially as described.

5. The combination, with the battery having the electrode 3, lever 13, attached to the electrode and pivotally mounted on standard 20, the lever and standard being of conducting material, of the case A, containing the battery and provided with the cover B, adapted to engage the lever 13 as the cover is closed, whereby the lever and standard form a conductor for the current and the closing of the cover removes the electrode from the battery-acid, substantially as described.

6. The combination, with the battery having the electrode 3, and a lever 13, attached to the electrode, of the case A, containing the battery and having the hinged cover B, the case and cover being provided, respectively, with slotted projections 18 14, and a curved link 15, sliding through said projections and having at its opposite ends pins 16 17, placed outside of and adapted to engage the projections, whereby the projection 14 actuates the lever when the cover is closed and the link stops the cover in its backward movement, substantially as described.

7. The combination, with the battery having the electrode 3, of case A, containing the battery and provided with a hinged cover, slotted projections, as 14 18, on the cover and case, a curved link, as 15, sliding through said projections and provided with the stop at each end outside of and adapted to engage the projections, and connections between the electrode and cover, whereby the lowering of the cover removes the electrode from the acid and the raising of the cover restores it to the acid, substantially as described.

In testimony whereof we have hereunto set our hands in the presence of two subscribing witnesses.

FRANKLIN P. HOENEMAN.
WILLIAM A. HOENEMAN.

Witnesses:
GEO. H. BOTTS,
J. J. KENNEDY.